US009855785B1

(12) United States Patent
Nagelberg et al.

(10) Patent No.: US 9,855,785 B1
(45) Date of Patent: Jan. 2, 2018

(54) DIGITALLY ENCODED SEAL FOR DOCUMENT VERIFICATION

(71) Applicant: UIPCO, LLC, San Antonio, TX (US)

(72) Inventors: Alexander B. Nagelberg, San Antonio, TX (US); Michael Justin Cairns, Helotes, TX (US)

(73) Assignee: UIPCO, LLC, San Antonio, TX (US)

( * ) Notice: Subject to any disclaimer, the term of this patent is extended or adjusted under 35 U.S.C. 154(b) by 0 days.

(21) Appl. No.: 15/477,969

(22) Filed: Apr. 3, 2017

Related U.S. Application Data

(60) Provisional application No. 62/317,923, filed on Apr. 4, 2016.

(51) Int. Cl.
| G06K 5/00 | (2006.01) |
| B42D 25/305 | (2014.01) |
| G06K 1/12 | (2006.01) |
| G06K 7/10 | (2006.01) |
| G06K 19/06 | (2006.01) |
| G06K 7/14 | (2006.01) |
| G06F 17/30 | (2006.01) |

(52) U.S. Cl.
CPC ...... B42D 25/305 (2014.10); G06F 17/30011 (2013.01); G06F 17/30879 (2013.01); G06K 1/121 (2013.01); G06K 7/10722 (2013.01); G06K 7/1413 (2013.01); G06K 7/1417 (2013.01); G06K 19/06028 (2013.01); G06K 19/06037 (2013.01)

(58) Field of Classification Search
CPC .. G06K 7/1408; G06K 7/1417; G06K 7/1426; G06K 7/1439; G06K 1/121; G06K 19/06037; B42D 25/30; B42D 25/305; G06F 21/608; G06F 21/64
See application file for complete search history.

(56) References Cited

U.S. PATENT DOCUMENTS

| 7,197,644 | B2 * | 3/2007 | Brewington | ....... H04N 1/32133 |
| | | | | 380/243 |
| 7,333,001 | B2 * | 2/2008 | Lane | .................... G06K 19/025 |
| | | | | 340/10.1 |
| 9,084,078 | B2 * | 7/2015 | Flanagan | ............... H04W 4/023 |
| 9,369,287 | B1 * | 6/2016 | Sarvestani | ............ G06F 21/608 |
| 2007/0220614 | A1 * | 9/2007 | Ellis | .................... G06F 21/6245 |
| | | | | 726/27 |

(Continued)

Primary Examiner — Thien M Le
Assistant Examiner — April Taylor
(74) Attorney, Agent, or Firm — Fish & Richardson P.C.

(57) ABSTRACT

Techniques are described for generating a seal that is applicable to an object, and scanning the seal to access encoded data to be used for verifying one or more characteristics of the object. The seal may be applied to a tangible document, such as a document printed on paper. The seal may encode data that is particularly associated with the document. For example, the seal may encode a hash of at least a portion of the information (e.g., text) included in the document. In some instances, the seal may encode a digital version and/or metadata of at least a portion of the information in the document. A scan of the seal may retrieve information useable to verify the authorship, provenance, originality, and/or unaltered contents of the documents. In some instances, the seal may encode information that enables the presentation of hidden information and/or metadata associated with the document.

16 Claims, 9 Drawing Sheets

(56) References Cited

U.S. PATENT DOCUMENTS

| | | | |
|---|---|---|---|
| 2009/0006860 A1* | 1/2009 | Ross | H04L 63/126 713/189 |
| 2009/0031135 A1* | 1/2009 | Kothandaraman | G06F 21/64 713/176 |
| 2009/0180698 A1* | 7/2009 | Ramani | G06K 9/2063 382/219 |
| 2013/0050765 A1* | 2/2013 | Zhan | G06K 9/00463 358/3.01 |

* cited by examiner

DIGITALLY ENCODED SEAL FOR DOCUMENT VERIFICATION

CROSS-REFERENCE TO RELATED APPLICATION

The present disclosure is related to, and claims priority to, U.S. Provisional Patent Application Ser. No. 62/317,923, titled "Digitally Encoded Seal for Document Verification," which was filed on Apr. 4, 2016, the entirety of which is incorporated by reference into the present disclosure.

BACKGROUND

Prior to the twentieth century, wax seals were employed to personalize a document, and provide an indication of the document's origin and authenticity. Today, similar physical seals are still used by notaries as proof that a signature was officially witnessed, but otherwise a seal is primarily used as a symbolic or ceremonial decoration. Given the ease of replicating a seal using modern equipment, seals are no longer useful for verifying authorship or authenticity of a document. In the digital world, certificates and encryption keys have, in some ways, taken the place of seals to provide security and/or authenticity for digital documents, pages, programs, and other types of digital media. However, traditional digital certificates and encryption keys are not useable for securing printed documents.

SUMMARY

Implementations of the present disclosure are generally directed to the generation and use of a seal that encodes information regarding an object. More specifically, implementations are directed to generating, and applying to a tangible document, a seal that encodes information associated with the document, and retrieving the encoded information through a scan of the seal to determine characteristic(s) of the document such as its authorship, originality, provenance, unaltered contents, hidden information, and so forth.

Innovative aspects of the subject matter described in this specification can be embodied in methods that includes actions of: determining data associated with a document; generating a seal that is applicable to a tangible version of the document, the seal encoding the data that is associated with the document; based on a scan of the seal applied to the tangible version of the document, receiving the data that is encoded in the seal; and employing the data to verify at least one characteristic of the tangible version of the document.

Implementations can optionally include one or more of the following features: the seal includes a barcode having at least one dimension; scanning the seal includes optically scanning at least a portion of the barcode to determine the data; the seal includes a near field communication (NFC) tag; scanning the seal includes receiving, from the NFC tag, a signal that encodes the data; the NFC tag is configured to remove the data from the NFC tag in response to a first instance of scanning of the NFC tag; the data is employed to verify that the tangible version of the document has not been altered since the seal was applied; the data includes a hash of information in the document; verifying that the tangible version of the document has not been altered since the seal was applied includes determining a current hash of the information in the document and comparing the current hash to the hash encoded in the seal; the data includes an identifier; verifying that the tangible version of the document has not been altered since the seal was applied includes sending the identifier to a back-end service and, in response, receiving a hash of information in the document, determining a current hash of the information in the document, and comparing the current hash to the hash encoded in the seal; the data includes information indicating a source of the tangible version of the document; the data is employed to verify the source; the actions further include employing the data to determine an address on a blockchain network; and/or the actions further include accessing funds stored at the address.

Innovative aspects of the subject matter described in this specification can also be embodied in a seal application device that includes: a scanner; an applicator; at least one processor; and a memory storing instructions which, when executed by the at least one processor, cause the at least one processor to perform operations comprising: receiving at least one image of a document, the at least one image generated by the scanner; determining, based on the at least one image, data associated with the document; and instructing the applicator to generate a seal that encodes the data associated with the document, the seal being applicable to a tangible version of the document.

Implementations can optionally include one or more of the following features: the operations further include instructing the applicator to apply the seal to the tangible version of the document; the seal is a barcode, of at least one dimension, that encodes the data; the seal includes a near field communication (NFC) tag configured to emit a signal that encodes the data; the data encoded in the seal includes a hash of information in the document; the data encoded in the seal includes an identifier of the document; and/or the identifier is received, through a network interface of the seal application device, from an external service.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Implementations provide for a seal that may be employed to verify the authenticity, origin, authorship, signature, and/or unaltered contents of a document. Traditional verification systems may employ costlier methods to authenticate a document, such as a more cumbersome analysis of a person's signature, analysis of the material on which the document is printed, chemical analysis of ink, and so forth. Accordingly, implementations provide a document verification system that may consume less time, less processing capacity, less memory, less storage, less network capacity, and generally fewer computing resources than traditional document verification systems. Moreover, by enabling a user to self-notarize a document as described further below, implementations enable the user to forego use of a third party notary when signing an official document. The implementations described herein provide a seal that is more secure, easier to inspect, and harder to fool than traditional techniques for verifying the authenticity, origin, authorship, signature, and/or unaltered contents of a document.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
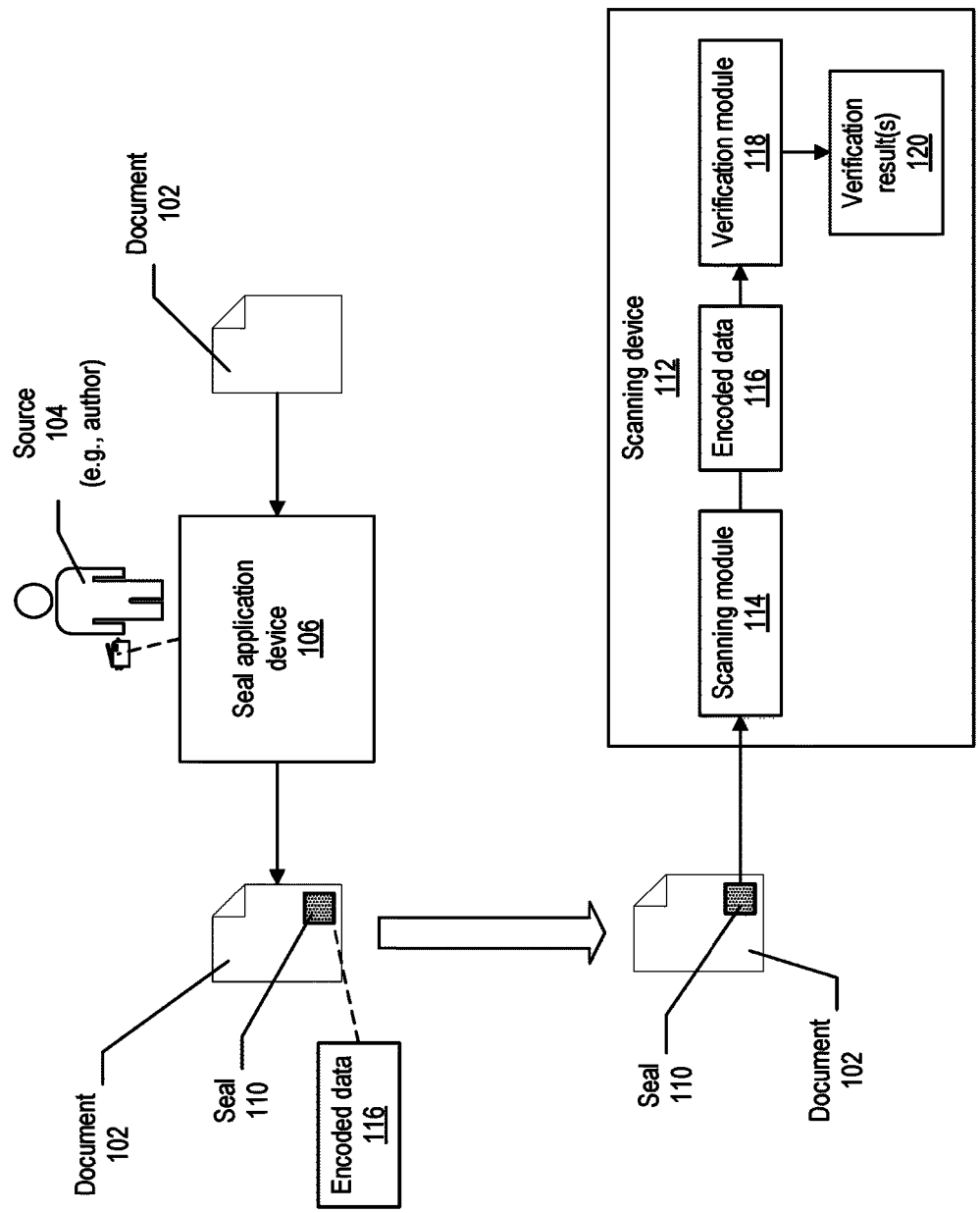
FIG. 1 depicts an example system for applying and scanning a seal that encodes data for document verification, according to implementations of the present disclosure.

Implementations of the present disclosure are directed to systems, devices, methods, and computer-readable media for applying a seal to a document or other tangible (e.g., physical) object, and scanning the seal to access encoded data to be used for verifying one or more characteristics of the document or other object. A seal may be applied to a tangible document, such as a document printed on paper. In some examples, the document may be a legal document such as a contract, lease, bill of sale, license, property title, and so forth. The seal may encode data that is particularly associated with the document. For example, the seal may encode a hash of at least a portion of the information (e.g., text) included in the document. In some instances, the seal may encode a digital version (e.g., image(s) and/or text data) of at least a portion of the information in the document. The seal may also encode metadata regarding the document such as an indication of the source (e.g., author) of the document, a creation date and/or time of the document, a date and/or time when the seal was applied to the document; an indication of the topic, type, or subject matter of the document; and/or other metadata.

In some implementations, the seal may be an optically scannable barcode having one or more dimensions. For example, the seal may be a one-dimensional barcode formatted according to a version of the Universal Product Code (UPC) format or other format. As another example, the seal may be a two-dimensional (e.g., matrix) barcode formatted according to a version of the Quick Response (QR) code format or other format. In some instances, the seal may be a three-dimensional barcode in which information is encoded in a depth dimension as well as along a width and/or length dimension. The seal may be imprinted onto a surface of the document using ink or using lasers to char the document according to the particular pattern of the seal. The seal may encode the data and/or metadata associated with the document on which the seal is placed, and the data and/or metadata may be retrieved by scanning the seal. The seal may be scanned using optical and/or infrared light, or using emissions in any other appropriate portion of the electromagnetic spectrum.

In some implementations, the seal may be a tag that is scannable using radio frequency emissions. For example, the seal may be a near field communication (NFC) tag and/or radio frequency identification (RFID) tag that emits a radio frequency signal that includes the data encoded in the tag.

The seal may be scanned to retrieve the data and/or metadata encoded therein. The retrieved information may be employed to verify one or more characteristics of the document as described below. In some implementations, the encoded data may include a hash of the contents of the document. The encoded hash may be compared to current hash of the document contents to determine whether the document has been altered since the seal was applied. In some example, a document may be notarized by applying the seal to the document. The document with the applied seal may be transferred between parties by hand, through the mail, by fax, or through other methods. A recipient of the document may scan the seal to retrieve the encoded data, the data may be analyzed to determine whether the document has been altered or tampered with in some way.

In instances where the encoded data includes metadata that describes an author, creator, and/or other source of the document, the encoded source information may be employed to verify the source and/or authenticity of the document. In this way, the seal may be employed with a signature on a document to indicate that the signature is an authoritative signature, e.g., to verify the identity of the signer. The seal may also enable verification of the authorship of a document. The seal may be employed for signing receipts for goods of purchase. The seal may also be employed to provide an authoritative signature on official documents such as deeds, titles, contracts, and so forth.

In some instances, the encoded data may include an identifier of the document, and the encoded data may be employed to determine whether the scanned physical document is an original or otherwise authorized version of the document. Given the unique nature of the seal, as described further below, the use of the seal may prevent a forgery of the document. In some implementations, the seal may encode an identifier or other information that provides access to information stored in a blockchain or other type of data storage. The information may provide for an audit trail that describes the history, authorship, provenance, and/or ownership of the document, or other information. The seal may enable duplicate documents to be interrogated and invalidated if they do not include the appropriate seal. In this way, the seal may be employed for notarizing documents as a supplement and/or replacement for traditional notarization methods.

In some implementations, the seal may be employed in conjunction with a blockchain network to enable the transfer of digital currency and/or crypto-currency (e.g., BitCoin™) using physical objects, such as printed notes. A seal may be applied to a paper note or other object, and the seal may encode data that is a blockchain address associated with funds. In some instances, the encoded data may include a private key used to access the address. The note may then be transferred to a recipient, who may scan the seal, retrieve the encoded data, and use the encoded address and/or key to access the funds. In some implementations, the sender may employ a seal application device to apply the seal to the note. The device may include a secure portion of storage (e.g., a digital wallet) and one or more software modules to enable a user to view an available balance in their account(s) and select an amount of funds to transfer. The device may interact with a blockchain network to generate a new address, and apply the seal that encodes the address and/or the key. In some implementations, the generation of the address is performed offline (e.g., mathematically), and the transfer of funds is performed on the (e.g., blockchain) network. In some implementations, and encoded address and/or key may be readable by an authorized recipient who is authenticated based on their own key or other credentials. The seal may include a NFC and/or RFID tag that is configured with logic such that, after a first scan of the tag, the tag reprograms itself to be no longer readable. In this way, implementations may enable a single read of the encoded data and thus enable the funds to be accessed by the authorized recipient but not others. Use of such a seal may prevent anyone from making a copy of the note on which the seal is affixed, and using the copies to gain access to the funds on the blockchain network. Through the use of such seals, implementations may provide a link between physical notes and digital currency on blockchains.

In some implementations, the data encoded in the seal may be destroyed after the first read, but the funds may still be accessible using a multi-signature technique. For example, a trusted authority and one other signer may release the funds, e.g., two of the three signatures may suffice to release the funds. This may allow recovery of the encoded data even after a bad first read of the seal has been performed that caused the destruction of the encoded data.

Implementations may also provide a link between physical objects and other types of information stored on blockchains. For example, a seal application device that applies the seal and/or a scanning device that scans the seal, may be linked with a user identity stored on a blockchain. This may enable a user in possession of a physical document to use their device to scan the seal on the document and receive information about who signed the document, who authored the document, and/or other metadata regarding the document. Such information may be stored on blockchains or other suitable types of data storage. The seal may also link a physical document to a digital manifest associated with the document.

The use of a seal in conjunction with information stored on blockchains or other data storage may enable an authorized user to view data and/or metadata that is not in the document itself, but that is associated with the document. In some implementations, different users may be able to access different sets of data and/or metadata regarding a document, based on different user privileges. Different users may have different private keys that are associated with a same public key for accessing the data and/or metadata regarding a document. For example, a doctor may sign a medical chart for a patient, and the chart may be shared with an insurance company. The insurance company may be able to access a subset of the data and/or metadata associated with the document, whereas the doctor and/or patient may be able to access a complete set of data and/or metadata for the chart.

Implementations may provide an application (e.g., app) that executes on smartphone or other (e.g., portable) computing devices. The application may provide an augmented view of a document, augmented to include data and/or metadata accessible to the particular user viewing the document. For example, the application may display private fields of information for which the user is granted access, and such private fields may be super-imposed over an image of the document captured using the device's camera. The application may examine a document and un-censor some or all of the document for a particular user. The device's camera and/or NFC reader may detect and scan the seal, and decrypt the encoded data using a key that is stored on the device. The encoded data may include additional information and/or metadata regarding the document, and the application may display the encoded data alongside in the visible text of the document in a user interface of the application.

Although examples herein may describe applying a seal to a document, implementations are not limited to this particular use. The seal may be applied to any suitable physical (e.g., tangible) object to provide an indication of the authenticity, source, non-altered state, and/or other characteristic(s) of the object. For example, the seal may be applied to a parcel, machine component (e.g., auto part), piece of art, antique, book, or any other suitable object whose authenticity, originality, authorship, and/or provenance may be questioned.

FIG. 1 depicts an example system for applying and scanning a seal that encodes data for document verification, according to implementations of the present disclosure. As shown in the example of FIG. 1, a document 102 may be accessed by a source 104. In some examples, the source 104 may be an author of the document 102. The source 104 may also be a signatory and/or signer of the document 102, or other individual associated with the document 102. In some implementations, the source 104 may employ a seal application device 106 by apply a seal 110 to the document 102. The seal application device 106 is described further with reference to FIG. 2. In some implementations, the seal application device 106 may scan at least a portion of the document 102 and generate data 116 to be encoded in the seal 110. For example, the encoded data 116 may include a hash of at least a portion of the contents (e.g., text data) of the document 102. The encoded data 116 may also include image(s) of at least a portion of the document 102, text data from the document 102, or other information. As described above, the encoded data 116 may include metadata, such as an identification of the source 104.

After the seal 110 is applied to the document 102, the document 102 may be accessed by other individual(s) and/or the source 104. The accessing individual(s) may employ a scanning device 112 to scan the seal 110 on the document 102. In some implementations, the scanning device 112 may include a scanning module 114 configured to scan the seal 110 and retrieve the encoded data 116 from the seal 110. The scanning module 114 may include hardware and/or software components. For example, in instances where the seal 110 is a scannable barcode, the scanning module 114 may include a suitable barcode scanner and/or camera to generate an image of the seal 110. The scanning module 114 may include software components that decode the barcode to generate the encoded data 116. In some instances, the tag may include active component(s) to perform processing on the tag instead of, or in addition to, the processing performed by the hardware and/or software components of the scanning device 112.

In instances where the seal 110 is a passive NFC and/or RFID tag, the scanning module 114 may include a transmitter to send a probe (e.g., interrogation) signal to the tag and a receiver to receive the radio frequency signal emitted from the tag in response to the probe signal. In instances where the seal is an active NFC and/or RFID tag, the scanning module 114 may include a receiver to receive the radio frequency signal emitted from the tag. The scanning module 114 may also include software components to analyze the signal from the tag and extracted the encoded data 116 from the signal.

The encoded data 116 may be provided to a verification module 118 executing on the scanning device 112. Based on the encoded data 116, the verification module 118 may generate verification result(s) 120 indicating whether or not particular characteristic(s) of the document 102 have been verified based at least partly on the encoded data 116. Operations of the seal application device 106 and scanning device 112 are described further with reference to FIG. 3. The various types of verification based on encoded data 116 are described further with reference to FIGS. 4-7.

Although the example of FIG. 1 shows the seal application device 106 and the scanning device 112 as separate devices, implementations are not so limited. In some implementations, a device may be configured to perform operations for applying the seal, scanning the seal to determine the encoded data 116, and/or analyzing the encoded data 116 to verify characteristic(s) of the document 102. In some instances, such a device may be a portable and/or mobile computing device such as a smartphone, tablet computer, and so forth, and the device may include hardware and/or software components to perform operations for seal application, scanning, and verification. In some instances, the device may be a portable device that is particularly configured to operate as the seal application device 106 and/or the scanning device 112.

Figure 2:
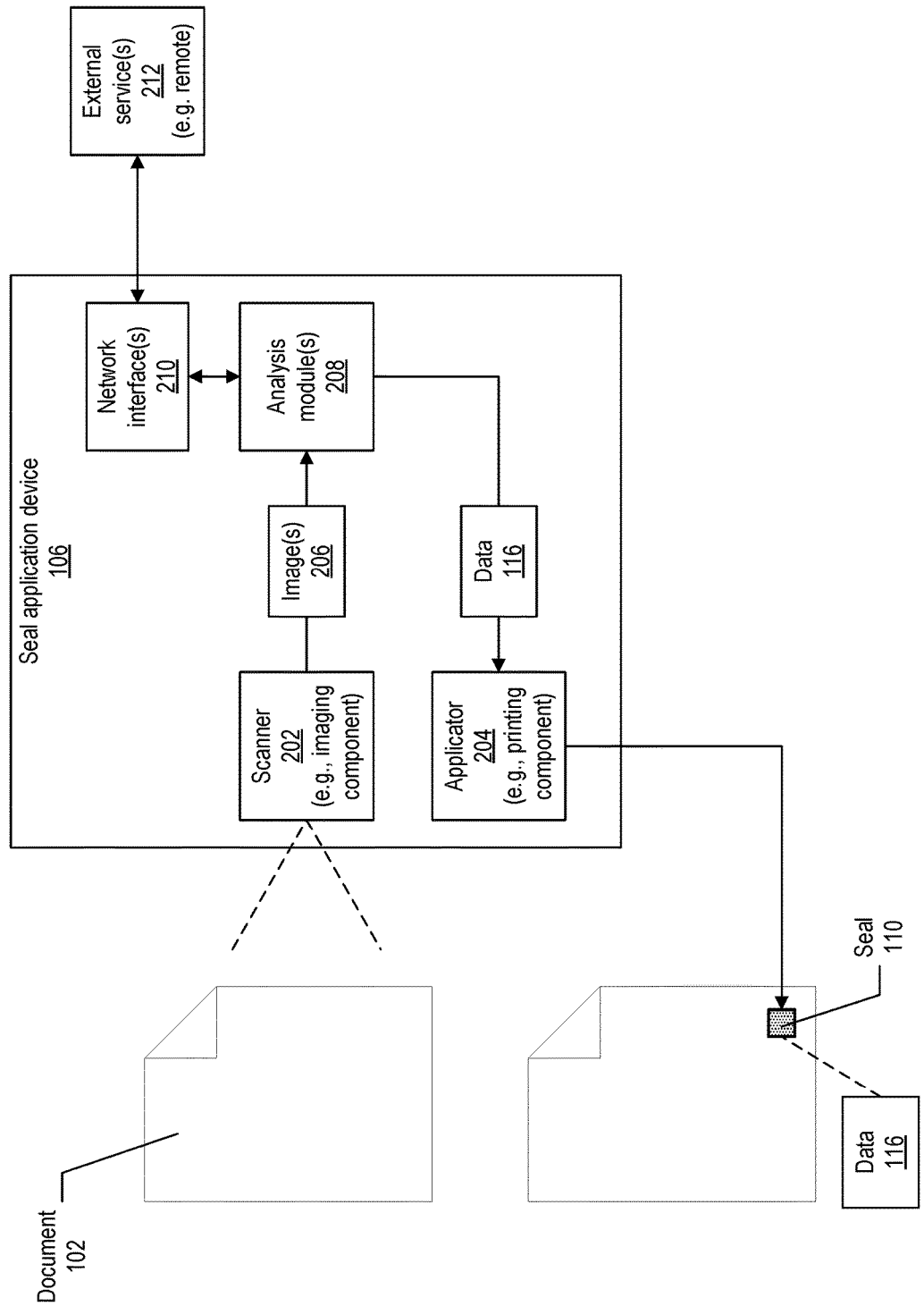
FIG. 2 depicts an example system for applying a seal that encodes data for document verification, according to implementations of the present disclosure.

FIG. 2 depicts an example system for applying a seal 110 that encodes data 116 for document verification, according to implementations of the present disclosure. The seal application device 106 may include a scanner 202. The scanner 202 may be configured to capture one or more images 206 of at least a portion of the document 102. For example, the scanner 202 may be a camera. The image(s) 206 may be provided to one or more analysis modules 208 executing on the seal application device 106. The analysis module(s) 208 may analyze the image(s) 206 and generate data 116 to be encoded in the seal 110. For example, the analysis module(s) 208 may perform optical character recognition (OCR) to generate text data based on the image(s) 206. The analysis module(s) 208 may hash the text data, using any suitable hashing algorithm, to generate data 116 that includes a hash of the text data. In some instances, the data 116 may include at least a portion of the generated text data and/or the captured image(s) 206. The data 116 may be provided to an applicator 204. In some implementations, the applicator 204 may be a printing component that prints the seal 110 onto the document 102. The seal 110 may encode the data 116 as described above.

In some implementations, the seal application device 106 may include one or more network interfaces 210 to enable the analysis module(s) 208 to communicate with external service(s) 212 (e.g., remove service(s)) over one or more wired and/or wireless networks. The external service(s) 212 may be back-end service(s) that execute on one or more server devices to support the application and use of seals 110 for verifying characteristic(s) of documents 102. The analysis module(s) 208 may communicate with the external service(s) 212 to determine the data 116 to be encoded in the seal 110. For example, the analysis module(s) 208 may communicate the hash of the document 102 to the external service(s) 212, which may respond with an identifier. The identifier may be included in the data 116 that is encoded in the seal 110. The external service(s) 212 may store a mapping between the identifier and the hash, to enable the hash to be subsequently retrieved based on the identifier.

The analysis module(s) 208 may also determine a source 104, e.g., the user currently logged into and/or using the seal application device 106. An identification of the source 104 and/or other metadata regarding the document 102 may be included in the data 116 encoded in the seal 110. Such metadata may also be communicated to the external service(s) 212 for storage. In some implementations, e.g., where the seal includes an NFC tag, the tag may negotiate credentials (e.g., directly). For example, the tag may receive a challenge and send back an encrypted and/or unrepeatable response using the challenge and the stored data.

The applicator 204 may use any appropriate method for representing digital information in a physical seal 110 applied to the document 102. For example, the data 116 may be represented in a format such as base 58 or other binary-to-text encoding schemes that use alphanumeric text to represent numeric (e.g., binary) data. As described above, the applicator 204 generate a seal 110 that is a scannable barcode of one or more dimensions. The applicator 204 may be a printer that uses heat to transfer ink, and/or laser(s) to burn paper to leave an imprint that is a seal 110.

In some implementations, the applicator 204 may be an electro-mechanical stamp configured to transfer ink to the document 102 to print the seal 110. For example, the applicator 204 may include an array of electro-mechanical shutters that each is in either an open or closed state at any time. A shutter may be configured such that it takes up ink in one state and does not take up ink in the other state. The applicator 204 may send the appropriate signals to cause the shutters to be in a particular state, to create a printable pattern that is the seal 110. For example, a matrix barcode (e.g., QR code) can contain as few as 500 pixels as two dimensions, and may not require fine precision to be accurately scannable. The applicator 204 may include the appropriate number (e.g., 500) shutters to print the matrix barcode. The user (e.g., source 104) may press the seal application device 106 onto an ink pad to enable the shutters to take up ink depending on their state, and the user may press the inked device 106 onto the document 102 to apply the seal 110.

Implementations also support the use of other types of applicators 204. For example, the applicator 204 may include a dynamically configurable hole punch that cuts a QR code or other type of seal 110 into the surface of the document 102 or through the document 102. In some implementations, the applicator 204 may be configured to release and/or affix a NFC tag onto the surface of the document 102 after having encoded the tag to include key(s), metadata, logic, and/or other information.

In some implementations, the seal application device 106 may reset and/or change keys when it detects the two impacts (e.g., one for stamping in ink, another for imprinting). The analysis module(s) 208 may generate a new key, a new hash, or otherwise different data 116 to be encoded into the seal 110, ensuring that each applied seal 110 is unique compared to other seals 110 applied by the same seal application device 106.

In some implementations, a NFC and/or RFID tag may be employed as the seal 110. A user may have access to a set of tags that are preprogrammed to encode a particular key or identifier. A tag may be affixed to a document 102 as the seal 110, and the seal application device 106 may scan the tag to retrieve the encoded key or identifier. The encoded information may then be communicated to the external service(s) 212 which may associate the key or identifier with other information regarding the document 102, such as a hash of the document 102. A subsequent scan of the tag by the scanning device 112 may access the key or identifier encoded in the tag, and that key or identifier may be used to retrieve the hash or other information regarding the document 102 from the external service(s) 212. The retrieved information may then be employed to verify that the document 102 has not been altered since the seal 110 was applied, or to verify other characteristic(s) of the document 102. As described above, the tag may be configured to morph and/or erase at least a portion of its encoded data to ensure that the tag may only be scanned once. A NFC and/or RFID tag may be used in the seal 110 instead of, or as a supplement to, the scannable barcode described above.

In some implementations, a multi-signature scheme may be employed to recover data encoded in a NFC and/or RFID tag after a first read, e.g., if the first read is bad or otherwise fails to retrieve the encoded data and causes the destruction of the encoded data. For example, two out of three possible keys may be used to retrieve and/or unlock the information, where the first key is with the receiver of the funds, the second key is with the sender, and the third key is with a trusted third party authority.

Figure 3:
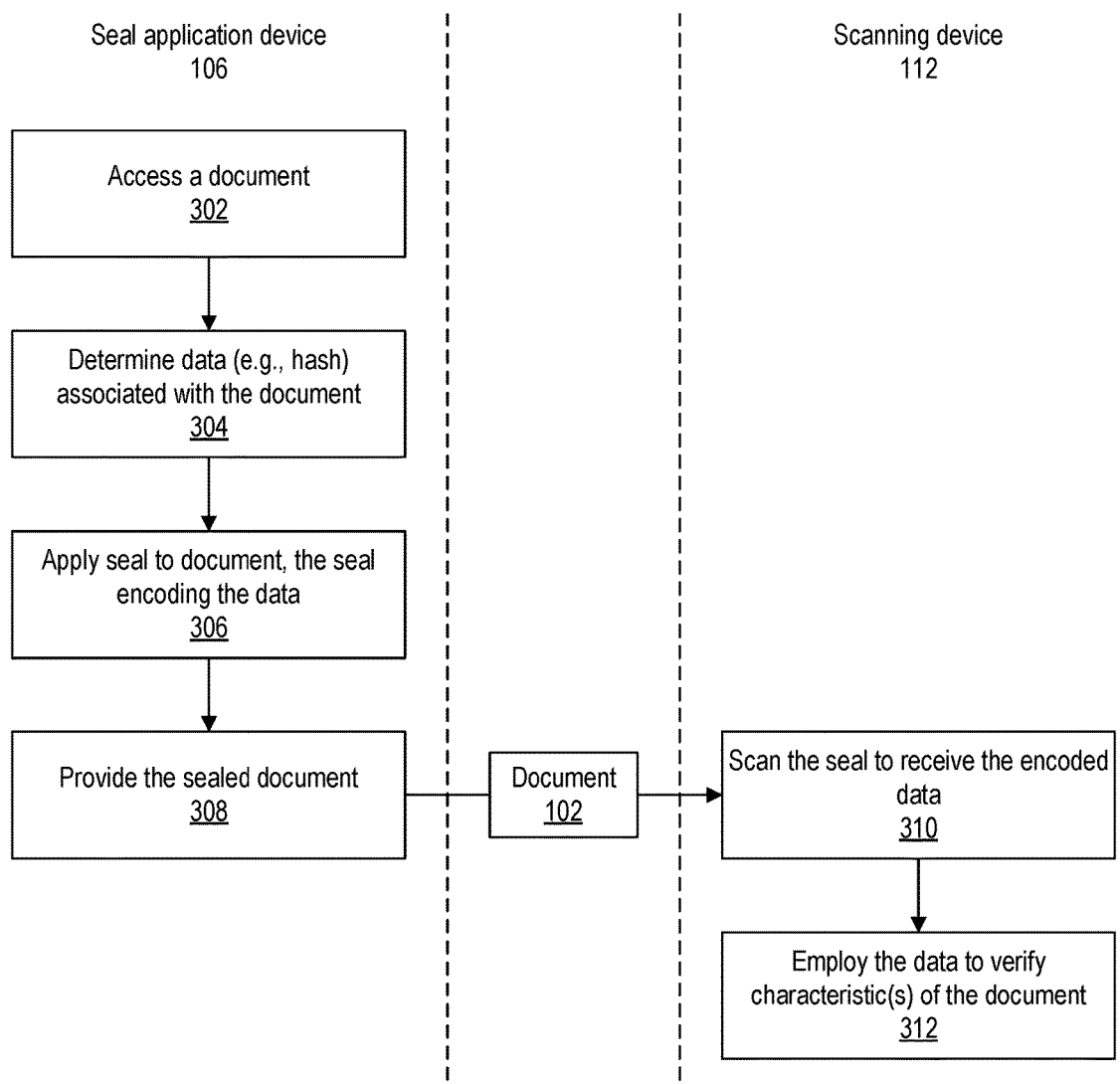
FIG. 3 depicts a flow diagram of an example process for applying and scanning a seal that encodes data for document verification, according to implementations of the present disclosure.

FIG. 3 depicts a flow diagram of an example process for applying and scanning a seal that encodes data for document verification, according to implementations of the present disclosure. Operations of the process may be performed by one or more of the scanning module 114, the verification module 118, the analysis module(s) 208, the external service(s) 212, and/or other software module(s) executing on the seal application device 106, the scanning device 112, or elsewhere.

A document 102 may be accessed (302). The document 102 may be analyzed to determine (304) data 116 that is particularly associated with the document 102. For example, a hash of at least a portion of the contents of the document 102 may be determined. Other data 116 may also be determined, such as metadata describing the source 104, creation date, seal date, topic, document type, or other information regarding the document 102. In some implementations, the data 116 may include the image(s) 206 of the document 102 and/or OCR-generated text data of the document 102. In some implementations, the data 116 may include a (e.g., unique) identifier that is associated with other information at the external service(s) 212. For example, the identifier may map to the hash of the document 102, metadata for the document 102, image(s) 206 of the document 102, OCR-generated text data for the document, and/or other information.

The seal 110 may be applied (306) to the document 102 such that the seal 110 encodes the data 116. The sealed document 102 may then be provided (308), or at least made available, for access by various individuals who may have an interest in the document 102. The receiving individual(s) may employ a scanning device 112. The seal 110 may be scanned (310) to receive the encoded data 116. The data 116 may be employed (312) to verify various characteristic(s) of the document 102, such as its authenticity, the authenticity of a signature, original authorship, source, unaltered contents, and/or other aspects.

Figure 4:
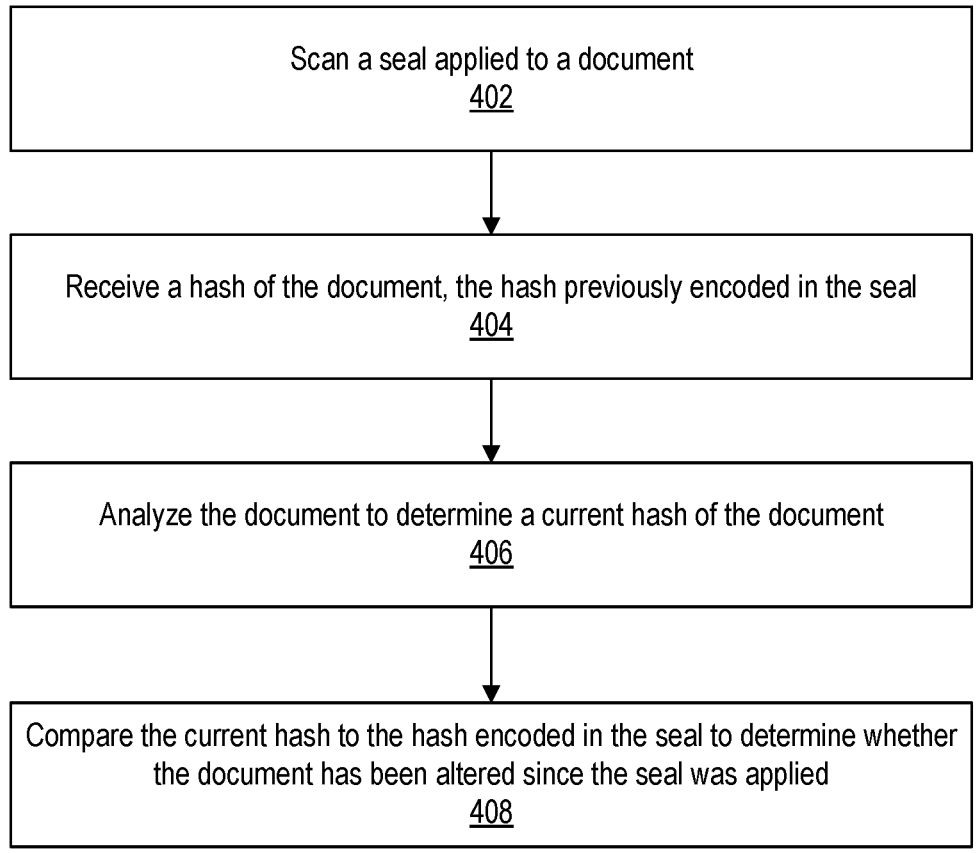
FIG. 4 depicts a flow diagram of an example process for scanning a seal to verify that a document has not been altered, according to implementations of the present disclosure.

FIG. 4 depicts a flow diagram of an example process for scanning a seal 110 to verify that a document 102 has not been altered, according to implementations of the present disclosure. Operations of the process may be performed by one or more of the scanning module 114, the verification module 118, the analysis module(s) 208, the external service(s) 212, and/or other software module(s) executing on the seal application device 106, the scanning device 112, or elsewhere.

The seal 110 may be scanned (402) and, in response to the scan, the encoded data 116 may be received (404). In some implementations, the seal 110 may encode a hash of the document 102, and the hash may be received in response to the scan. In some implementations, the seal 110 may encode an identifier. The identifier may be sent to the external service(s) 212, which may respond with the previously determined hash for the document 102 and/or other information regarding the document 102. In some instances, the external service(s) 212 may include a distributed ledger system (e.g., blockchain system) with identity management, which supports immutable records and/or version(s) of the document 102. The document 102 may be imaged and/or analyzed (406) to determine a current hash of the document 102. The current hash is compared (408) with the previously generated hash that was either encoded in the seal 110 or stored by the external service(s) 212. Based on the comparison, a determination may be made whether the document 102 has been altered (e.g., edited, tampered with, corrupted) since the seal 110 was applied, given that an alteration of the document 102 would cause a change in the hash. In some implementations, the comparison between hashes may be a fuzzy comparison may tolerate (e.g., allow) small variances between the hashes, to account for possible infidelity in the scanning process. In such implementations, a correspondence between the hashes may be determined if the hashes match or if the hashes are within a predetermined threshold tolerance of one another.

Figure 5:
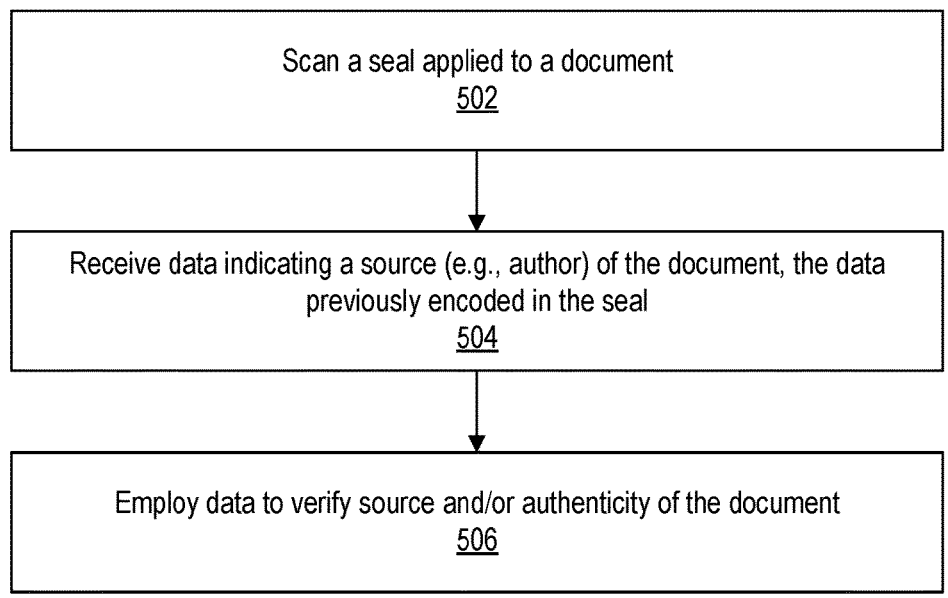
FIG. 5 depicts a flow diagram of an example process for scanning a seal to verify the source and/or authenticity of a document, according to implementations of the present disclosure.

FIG. 5 depicts a flow diagram of an example process for scanning a seal 110 to verify the source 104 and/or authenticity of a document 102, according to implementations of the present disclosure. Operations of the process may be performed by one or more of the scanning module 114, the verification module 118, the analysis module(s) 208, the external service(s) 212, and/or other software module(s) executing on the seal application device 106, the scanning device 112, or elsewhere.

The seal 110 may be scanned (502) and, in response to the scan, the encoded data 116 may be received (504). In some implementations, the seal 110 may encode data indicating a source 104 (e.g., author or signer) of the document 102, and the source indicator may be received in response to the scan. In some implementations, the seal 110 may encode an identifier. The identifier may be sent to the external service(s) 212, which may respond with the previously determined source indicator for the document 102 and/or other information regarding the document 102. The source indicator may be employed (506) to verify the identity of the source 104, the authenticity of the document 102, and/or the authenticity of the source 104.

In some instances, a source 104 or other user may have personal seal(s) that are uniquely associated with the user, and they may employ such a seal with their signature on a document 102 to enable others to verify that they signature is authentic. In this way, implementations provide for a self-notarization process that does not require a $3^{rd}$ party notary. In some instances, the user may employ the seal application device 106 to apply a different seal 110 each time it is used, with each seal 110 being associated with the user. For example, as described with reference to FIG. 2, a printed seal 110 may be altered with each instance of sealing, such that each seal 110 is unique associated with the particular document 102 being sealed while still being associated with the user. Use of different seals 110 for a particular user may provide for seals 110 that are more secure than reused, duplicate seals 110, given that the single seal 110 may be more easily copied or forged. A user may have their own key or other credentials, and the user may encrypt the information in the seal using their particular key or credentials.

In some implementations, a signature may include a public portion and a one-time encrypted portion. The signature may provide unique data while indicating that it is from a particular user. For example, a signature can include information that identifies the author, and a token and/or one-time visible data in a hash such that a viewer can determine that a public key matches the signature as well as verify that the message (e.g., token) was signed with that key.

Figure 6:
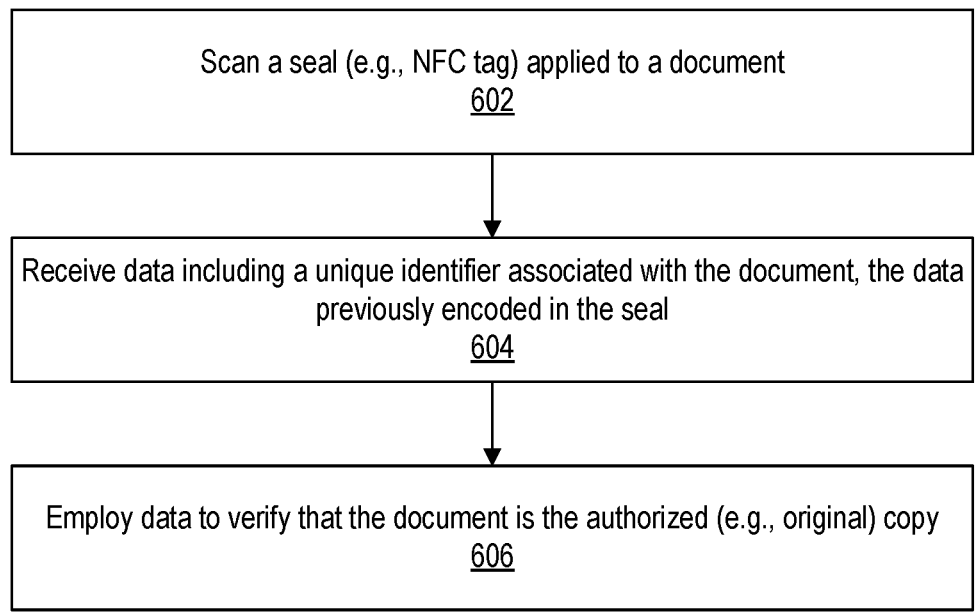
FIG. 6 depicts a flow diagram of an example process for scanning a seal to verify that a document is an authorized (e.g., original) version of the document, according to implementations of the present disclosure.

FIG. 6 depicts a flow diagram of an example process for scanning a seal 110 to verify that a document 102 is an authorized (e.g., original) version of the document, according to implementations of the present disclosure. Operations of the process may be performed by one or more of the scanning module 114, the verification module 118, the analysis module(s) 208, the external service(s) 212, and/or other software module(s) executing on the seal application device 106, the scanning device 112, or elsewhere.

The seal 110 may be scanned (602) and, in response to the scan, the encoded data 116 may be received (604). In some implementations, the seal 110 may encode a (e.g., unique) identifier associated with the document 102, and the document identifier may be received in response to the scan. The encoded document identifier may be employed (606) to verify that the document 102 being scanned is the original and/or authorized copy of the document 102, instead of an unauthorized copy (e.g., a forgery). For example, the encoded document identifier may be compared with a document identifier previously stored by the external service(s) 212, the stored document identifier associated with the document 102 by the external service(s) 212. Based on a correspondence between the encoded identifier and the stored identifier, the authenticity of the document 102 may be verified. In some implementations, the seal 110 may be a NFC and/or RFID tag that is configured to erase its stored data and/or logic in response to an initial scan of the tag, thus ensuring that the tag may only be read once. In some implementations, the external service(s) 212 may enforce the single read policy by only returning the stored document identifier in response to the first request received for that particular document identifier.

Figure 7:
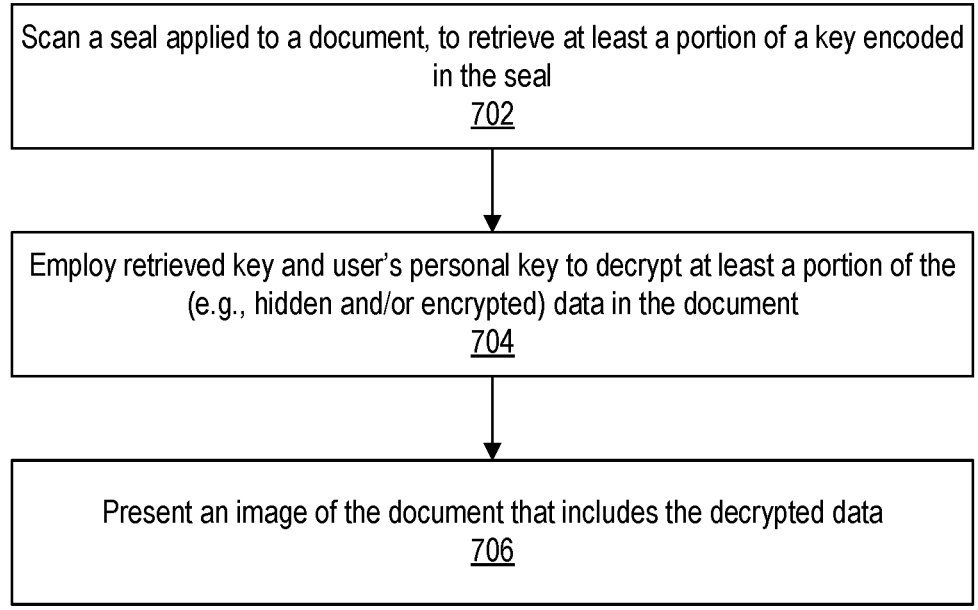
FIG. 7 depicts a flow diagram of an example process for presenting hidden and/or encrypted data of a document using information encoded in a seal, according to implementations of the present disclosure.

FIG. 7 depicts a flow diagram of an example process for presenting hidden and/or encrypted data of a document 102 using information encoded in a seal 110, according to implementations of the present disclosure. Operations of the process may be performed by one or more of the scanning module 114, the verification module 118, the analysis module(s) 208, the external service(s) 212, and/or other software module(s) executing on the seal application device 106, the scanning device 112, or elsewhere.

In some implementations, a physical document 102 may include one or more portions that are encrypted, hidden, and/or otherwise obfuscated, such that a reader may not be able to read the entire document 102 simply by looking at the document 102. The encrypted, hidden, obfuscated, or otherwise unreadable portions of the document 102 may be presented to an authorized reader based on the reader's personal key and based on the key that is encoded in the seal 110.

The seal 110 that has been applied to a document 102 may be scanned (702) to retrieve at least a portion of a key that is encoded in the seal 110. The retrieved information and/or a user's personal key may be employed (704) to decrypt those portion(s) of the document 102 that are encrypted, hidden, or otherwise obfuscated. An image of the document 102 may be presented (706) to the user, the image including the contents of the document 102 including a readable (e.g., decrypted) version of the otherwise unreadable portion(s). In some instances, the image of the document 102 may be presented through a user interface of the scanning device 112. In this way, implementations enable an unauthorized user to view (e.g., secure and/or secret) portions of the document 102 that may not be viewable to other users. In some examples, metadata regarding the document 102 may be presented in the image. Such metadata may include information regarding the origin, author, and/or provenance of the document 102.

Figure 8:
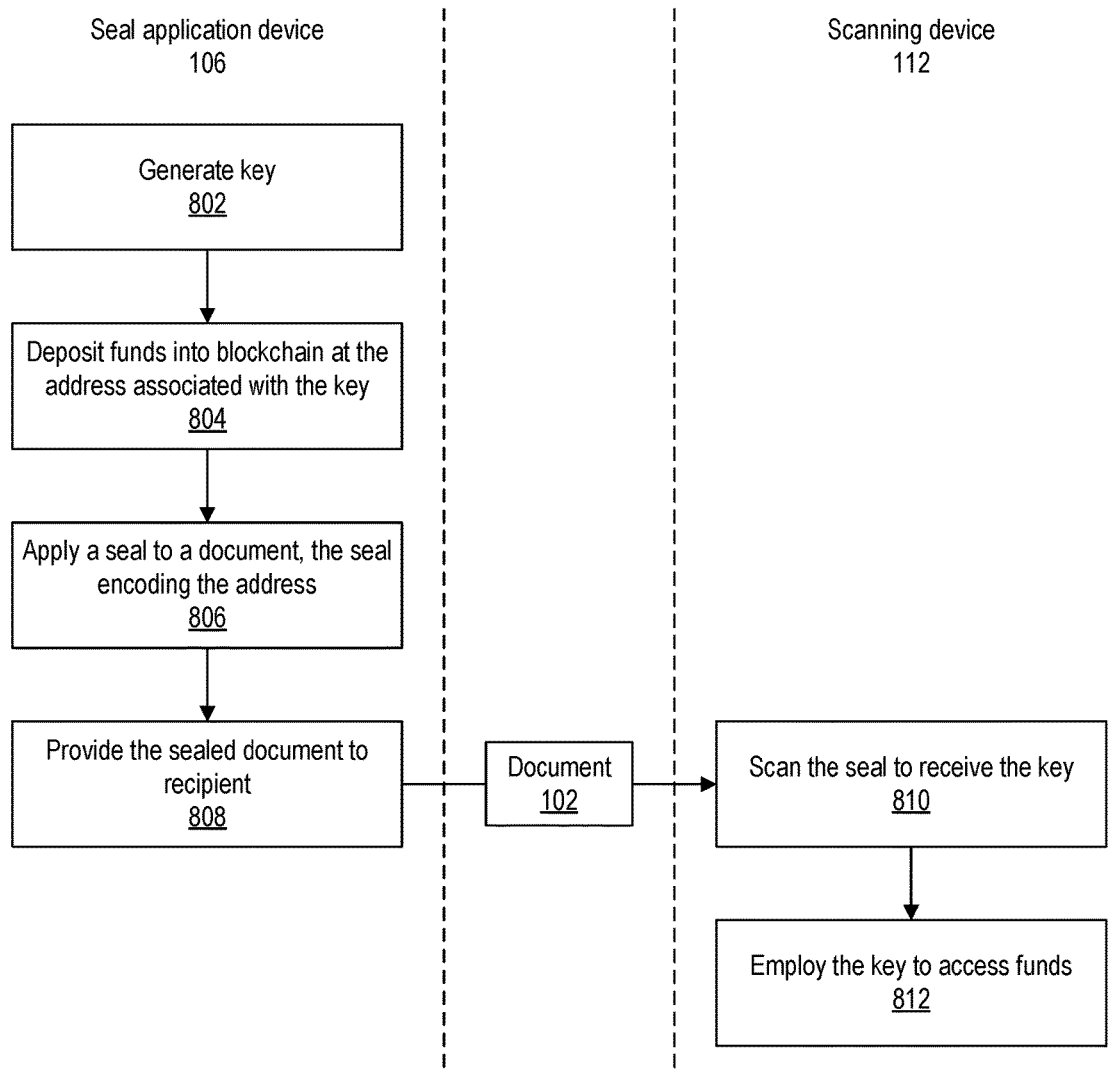
FIG. 8 depicts a flow diagram of an example process for employing a seal to facilitate physical transfer of digital currency, according to implementations of the present disclosure.

FIG. 8 depicts a flow diagram of an example process for employing a seal 110 to facilitate physical transfer of digital currency, according to implementations of the present disclosure. Operations of the process may be performed by one or more of the scanning module 114, the verification module 118, the analysis module(s) 208, the external service(s) 212, and/or other software module(s) executing on the seal application device 106, the scanning device 112, or elsewhere.

A new private key may be generated (802), as described further below. The private key may be associated with a blockchain address. In some instances, a user may specify that funds are to be deposited (804) to a blockchain network at the generated address. The seal 110 may be applied (806) to a document 102 such as a note, piece of paper, or other object, as described above. The seal 110 may encode the private key, and the funds may be sent to the address associated with the private key. In some instances, the seal 110 may encode an identifier that is associated with the address by the external service(s) 212. The document 102 with the seal 110 may be provided (808) to the intended recipient of the funds. The recipient may scan (810) the seal 110 to determine the key, which may be used to access the funds.

In some implementations, a user may also be able to recover funds using a multi-signature (e.g., two out of three signatures) technique such as that described above. For example, if the key is destroyed and/or lost the funds may still be accessed using keys in the possession of two out of three parties including the sender, the receiver, and a third party trusted authority to resolve disputes. A key may be provided to the receiver to enable this recovery.

The recipient may employ (812) the key to access the funds. In some implementations, the seal 110 may be a NFC and/or RFID tag that is configured to erase its stored data and/or logic in response to an initial scan of the tag, thus ensuring that the tag may only be read once. In such instances, the tag may encode an identifier that is associated, by the external service(s) 212, with the address for the funds. In some implementations, the external service(s) 212 may enforce the single read policy by only returning the address in response to the first request received for that particular address associated with the encoded identifier.

In some implementations, e.g., where the seal 110 is a NFC and/or RFID tag, the process of FIG. 8 may include an operation in which the scanning device 112 sends a read request to the tag. The tag may receive the read request and respond by sending a signal that includes the private key encoded in the tag. The tag may then execute logic to destroy the key or otherwise render the key unretrievable in response to subsequent read requests, as described above.

To provide further context for the present disclosure, a high-level discussion of blockchain technology is provided. In general, a blockchain is a public ledger of all transactions that have ever been executed in one or more contexts (e.g., negotiable instrument transactions, digital currency transactions, etc.). A blockchain constantly grows as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all users (e.g., financial institutions) need to know all previous transactions (e.g., deposits, withdrawals, etc.) to validate a requested transaction, all users must agree on which transactions have actually occurred, and in which order. For example, if two users observe different transaction histories, they will be unable to come to the same conclusion regarding the validity of a transaction. The blockchain enables all users to come to an agreement as to transactions that have already occurred, and in which order. In short and as described in further detail below, a ledger of transactions is agreed to, based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as described above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger system can include one or more sidechains. A sidechain can be described as a blockchain that validates data from other blockchains. In some examples, a sidechain enables ledger assets (e.g., a digital currency) to be transferred between multiple blockchains.

Figure 9:
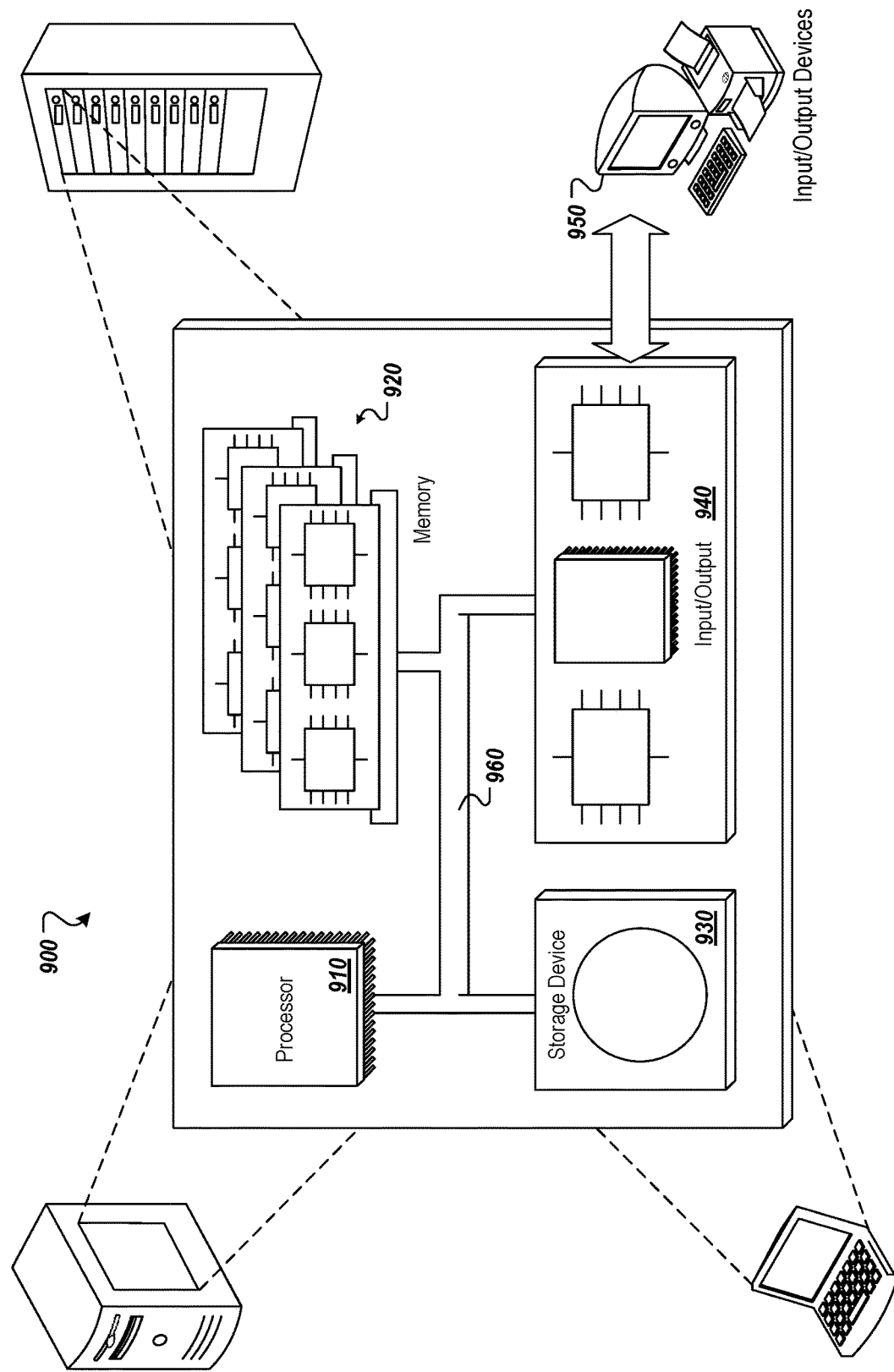
FIG. 9 depicts an example computing system, according to implementations of the present disclosure.

FIG. 9 depicts an example computing system, according to implementations of the present disclosure. The system 900 may be used for one or more of the operations described with respect to the various implementations discussed herein. For example, the system 900 may be included, at least in part, in one or more of the seal application device 106, the scanning device 112, or other computing device(s) described herein. The system 900 may include one or more processors 910, a memory 920, one or more storage devices 930, and one or more input/output (I/O) devices 950 controllable through one or more I/O interfaces 940. The various components 910, 920, 930, 940, or 950 may be interconnected through at least one system bus 960, which may enable the transfer of data between the various modules and components of the system 900.

The processor(s) 910 may be configured to process instructions for execution within the system 900. The processor(s) 910 may include single-threaded processor(s), multi-threaded processor(s), or both. The processor(s) 910 may be configured to process instructions stored in the memory 920 or on the storage device(s) 930. The processor(s) 910 may include hardware-based processor(s) each including one or more cores. The processor(s) 910 may include general purpose processor(s), special purpose processor(s), or both.

The memory 920 may store information within the system 900. In some implementations, the memory 920 includes one or more computer-readable media. The memory 920 may include any suitable number of volatile memory units and/or non-volatile memory units. The memory 920 may include read-only memory, random access memory, or both. In some examples, the memory 920 may be employed as active or physical memory by one or more executing software modules.

The storage device(s) 930 may be configured to provide (e.g., persistent) mass storage for the system 900. In some implementations, the storage device(s) 930 may include one or more computer-readable media. For example, the storage device(s) 930 may include a floppy disk device, a hard disk device, an optical disk device, or a tape device. The storage device(s) 930 may include read-only memory, random access memory, or both. The storage device(s) 930 may include one or more of an internal hard drive, an external hard drive, or a removable drive.

One or both of the memory 920 or the storage device(s) 930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 900. In some implementations, the CRSM may include a data store that provides storage of computer-readable instructions or other information in a non-transitory format. The CRSM may be incorporated into the system 900 or may be external with respect to the system 900. The CRSM may include read-only memory, random access memory, or both. One or more CRSM suitable for tangibly embodying computer program instructions and data may include any suitable type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 910 and the memory 920 may be supplemented by, or incorporated into, one or more application-specific integrated circuits (ASICs).

The system 900 may include one or more I/O devices 950. The I/O device(s) 950 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 950 may also include one or more output devices such as a display, LED(s), an audio output device (e.g., a speaker), a printer, a haptic output device, and so forth. The I/O device(s) 950 may be physically incorporated in one or more computing devices of the system 900, or may be external with respect to one or more computing devices of the system 900.

The system 900 may include one or more I/O interfaces 940 to enable components or modules of the system 900 to control, interface with, or otherwise communicate with the I/O device(s) 950. The I/O interface(s) 940 may enable information to be transferred in or out of the system 900, or between components of the system 900, through serial communication, parallel communication, or other types of communication. For example, the I/O interface(s) 940 may comply with a version of the RS-232 standard for serial ports, or with a version of the IEEE 1284 standard for parallel ports. As another example, the I/O interface(s) 940 may be configured to provide a connection over Universal Serial Bus (USB) or Ethernet. In some examples, the I/O interface(s) 940 may be configured to provide a serial connection that is compliant with a version of the IEEE 1394 standard.

The I/O interface(s) 940 may also include one or more network interfaces (e.g., the network interface(s) 210) that enable communications between computing devices in the system 900, and/or between the system 900 and other network-connected computing systems. The network interface(s) may include one or more network interface controllers (NICs) or other types of transceiver devices configured to send and receive communications over one or more networks using any suitable network protocol.

Computing devices of the system 900 may communicate with one another, or with other computing devices, using one or more networks. Such networks may include public networks such as the internet, private networks such as an institutional or personal intranet, or any combination of private and public networks. The networks may include any suitable type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 900 may include one or more computing devices of any suitable type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and/or processor(s) of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A seal application device comprising:
   a scanner;
   an applicator;
   at least one processor; and
   a memory storing instructions which, when executed by the at least one processor, cause the at least one processor to perform operations comprising:
      receiving at least one image of a document, the at least one image generated by the scanner;
      determining, based on the at least one image, data associated with the document;
      instructing the applicator to generate a seal that encodes the data associated with the document, the seal being applicable to a tangible version of the document, wherein the seal includes a near field communication (NFC) tag, and wherein the NFC tag is configured to remove the data from the NFC tag in response to a first scan of the NFC tag;
      based on a scan of the seal applied to the tangible version of the document, determining the data that is encoded in the seal, wherein the scan of the seal includes receiving a signal emitted from the NFC tag, the signal carrying the data; and
      employing the data to verify at least one characteristic of the tangible version of the document.

2. The seal application device of claim 1, the operations further comprising:
   instructing the applicator to apply the seal to the tangible version of the document.

3. The seal application device of claim 1, wherein the seal further includes a barcode, of at least one dimension, that encodes the data.

4. The seal application device of claim 1, wherein the data encoded in the seal includes a hash of information in the document.

5. The seal application device of claim 1, wherein:
   the data encoded in the seal includes an identifier of the document; and
   the identifier is received from an external service.

6. A computer-implemented method performed by at least one processor, the method comprising:
   receiving, by the at least one processor, at least one image of a document;
   determining, by the at least one processor, based on the at least one image, data associated with the document;
   generating, by the at least one processor, a seal that encodes the data associated with the document, the seal being applicable to a tangible version of the document, wherein the seal includes a near field communication (NFC) tag, and wherein the NFC tag is configured to remove the data from the NFC tag in response to a first scan of the NFC tag;
   based on a scan of the seal applied to the tangible version of the document, determining, by the at least one processor, the data that is encoded in the seal, wherein the scan of the seal includes receiving a signal emitted from the NFC tag, the signal carrying the data; and
   employing, by the at least one processor, the data to verify at least one characteristic of the tangible version of the document.

7. The method of claim 6, wherein:
   the seal further includes a barcode having at least one dimension; and
   the scan of the seal further includes an optical scan of at least a portion of the barcode to determine the data.

8. The method of claim 6, wherein the data is employed to verify that the tangible version of the document has not been altered since the seal was applied.

9. The method of claim 8, wherein:
   the data includes a hash of information in the document; and
   verifying that the tangible version of the document has not been altered since the seal was applied includes:
      determining a current hash of the information in the document; and
      comparing the current hash to the hash encoded in the seal.

10. The method of claim 8, wherein:
    the data includes an identifier of the document; and
    verifying that the tangible version of the document has not been altered since the seal was applied includes:
       sending the identifier to a back-end service and, in response, receiving a hash of information in the document;
       determining a current hash of the information in the document; and
       comparing the current hash to the hash encoded in the seal.

11. The method of claim 6, wherein:
    the data includes information indicating a source of the tangible version of the document; and
    the data is employed to verify the source.

12. The method of claim 6, further comprising:
    employing, by the at least one processor, the data to determine an address on a blockchain network; and
    accessing, by the at least one processor, funds associated with the address.

13. One or more computer-readable media storing instructions which, when executed by at least one processor, cause the at least one processor to perform operations comprising:
    receiving at least one image of a document;
    determining, based on the at least one image, data associated with the document;
    generating a seal that is applicable to a tangible version of the document, the seal encoding the data that is associated with the document, wherein the seal includes a near field communication (NFC) tag, and wherein the NFC tag is configured to remove the data from the NFC tag in response to a first scan of the NFC tag;
    based on a scan of the seal applied to the tangible version of the document, determining the data that is encoded in the seal, wherein the scan of the seal includes receiving a signal emitted from the NFC tag, the signal carrying the data; and
    employing the data to verify at least one characteristic of the tangible version of the document.

14. The one or more computer-readable media of claim 13, wherein the data is employed to verify that the tangible version of the document has not been altered since the seal was applied.

15. The one or more computer-readable media of claim 14, wherein:
- the data includes a hash of information in the document; and
- verifying that the tangible version of the document has not been altered since the seal was applied includes:
  - determining a current hash of the information in the document; and
  - comparing the current hash to the hash encoded in the seal.

16. The one or more computer-readable media of claim 14, wherein:
- the data includes an identifier; and
- verifying that the tangible version of the document has not been altered since the seal was applied includes:
  - sending the identifier to a back-end service and, in response, receiving a hash of information in the document;
  - determining a current hash of the information in the document; and
  - comparing the current hash to the hash encoded in the seal.

* * * * *